United States Patent
Meredith et al.

(10) Patent No.: US 10,631,032 B2
(45) Date of Patent: *Apr. 21, 2020

(54) DYNAMIC VIDEO IMAGE SYNTHESIS USING MULTIPLE CAMERAS AND REMOTE CONTROL

(71) Applicant: AT&T Mobility II LLC, Atlanta, GA (US)

(72) Inventors: Sheldon Kent Meredith, Roswell, GA (US); Jeremy Fix, Acworth, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/156,846

(22) Filed: Oct. 10, 2018

(65) Prior Publication Data
US 2019/0045253 A1  Feb. 7, 2019

Related U.S. Application Data

(63) Continuation of application No. 14/884,495, filed on Oct. 15, 2015, now Pat. No. 10,129,579.

(51) Int. Cl.
*H04N 21/2668* (2011.01)
*H04N 21/218* (2011.01)
(Continued)

(52) U.S. Cl.
CPC ..... *H04N 21/2668* (2013.01); *H04N 21/2187* (2013.01); *H04N 21/21805* (2013.01);
(Continued)

(58) Field of Classification Search
CPC ........ H04N 21/2668; H04N 21/21805; H04N 21/2187; H04N 21/23439; H04N 21/2387;
(Continued)

(56) References Cited

U.S. PATENT DOCUMENTS 5,068,733 A  11/1991  Bennett
5,448,291 A   9/1995  Wickline et al.
(Continued)

FOREIGN PATENT DOCUMENTS

WO      9625710 A1   8/1996
WO      9912349 A1   3/1999
WO   2004068855 A1   8/2004

OTHER PUBLICATIONS

Hayashi, Kunihiko et al., "Synthesizing Free-Viewpoing Images from Multiple View Videos in Soccer StadiumADIUM", Computer Graphics, Imaging and Visualisation, 2006 International Conference on. IEEE, 2006.
(Continued)

*Primary Examiner* — Randy A Flynn
(74) *Attorney, Agent, or Firm* — Guntin & Gust, PLC; John G. Rauch (57) ABSTRACT

Aspects of the subject disclosure may include, for example, receiving, at a broadcast image processor, from a single broadcast event, a plurality of camera feeds, wherein the camera feeds each comprise an image of the single broadcast event from a different angle, providing, by the broadcast image processor, a summary of the plurality of camera feeds to a media processor, receiving, by the broadcast image processor, a request to select a requested angle from among the plurality of camera feeds from the media processor, and creating, by the broadcast image processor, a custom view from the plurality of camera feeds according to the request for the media processor. Other embodiments are disclosed.

20 Claims, 6 Drawing Sheets

(51) Int. Cl.
*H04N 21/2187* (2011.01)
*H04N 21/2343* (2011.01)
*H04N 21/2387* (2011.01)
*H04N 21/239* (2011.01)
*H04N 21/2665* (2011.01)
*H04N 21/458* (2011.01)
*H04N 21/462* (2011.01)
*H04N 21/472* (2011.01)
*H04N 21/6408* (2011.01)
*H04N 21/8549* (2011.01)

(52) U.S. Cl.
CPC ..... *H04N 21/2387* (2013.01); *H04N 21/2393* (2013.01); *H04N 21/23439* (2013.01); *H04N 21/2665* (2013.01); *H04N 21/458* (2013.01); *H04N 21/4622* (2013.01); *H04N 21/47202* (2013.01); *H04N 21/6408* (2013.01); *H04N 21/8549* (2013.01)

(58) Field of Classification Search
CPC ........... H04N 21/2393; H04N 21/2665; H04N 21/458; H04N 21/4622; H04N 21/47202; H04N 21/6408; H04N 21/8549
See application file for complete search history.

(56) References Cited

U.S. PATENT DOCUMENTS

| | | | |
|---|---|---|---|
| 5,600,368 A | 2/1997 | Matthews | |
| 5,745,126 A | 4/1998 | Katkere et al. | |
| 6,144,375 A | 11/2000 | Jain et al. | |
| 6,181,334 B1 | 1/2001 | Freeman et al. | |
| 6,353,461 B1 | 3/2002 | Shore et al. | |
| 6,408,128 B1 | 6/2002 | Abecassis | |
| 7,079,176 B1 | 7/2006 | Freeman | |
| 7,193,645 B1 | 3/2007 | Aagaard et al. | |
| 7,448,063 B2 | 11/2008 | Freeman | |
| 7,671,893 B2 | 3/2010 | Li et al. | |
| 7,823,056 B1 | 10/2010 | Davey et al. | |
| 7,852,372 B2 | 12/2010 | Sohmers et al. | |
| 7,884,855 B2 | 2/2011 | Ortiz et al. | |
| 8,035,686 B2 | 10/2011 | Wilson et al. | |
| 8,184,169 B2 | 5/2012 | Ortiz et al. | |
| RE43,462 E | 6/2012 | Washino | |
| 8,295,649 B2 | 10/2012 | Berini et al. | |
| 8,391,774 B2 | 3/2013 | Arseneau et al. | |
| 8,638,368 B2 | 1/2014 | Frederick et al. | |
| 8,675,073 B2 | 3/2014 | Aagaard et al. | |
| 2002/0108125 A1 | 8/2002 | Joao | |
| 2003/0038805 A1 | 2/2003 | Wong et al. | |
| 2003/0122949 A1 | 7/2003 | Kanematsu et al. | |
| 2004/0261127 A1 | 12/2004 | Freeman et al. | |
| 2005/0005308 A1 | 1/2005 | Logan et al. | |
| 2005/0248802 A1 | 11/2005 | Nomura et al. | |
| 2005/0273830 A1 | 12/2005 | Silver et al. | |
| 2006/0047674 A1 | 3/2006 | Visharam et al. | |
| 2006/0195882 A1* | 8/2006 | Tischer ............ H04N 21/25875 725/116 |
| 2006/0200574 A1 | 9/2006 | Pickens et al. | |
| 2007/0094698 A1 | 4/2007 | Bountour et al. | |
| 2009/0165046 A1 | 6/2009 | Stallings et al. | |
| 2010/0104005 A1 | 4/2010 | Amsterdam et al. | |
| 2010/0259595 A1 | 10/2010 | Trimeche et al. | |
| 2010/0304731 A1 | 12/2010 | Bratton et al. | |
| 2011/0234819 A1 | 9/2011 | Gabriel | |
| 2013/0162781 A1 | 6/2013 | Hubner et al. | |
| 2013/0223812 A1 | 8/2013 | Rossi et al. | |
| 2013/0259447 A1 | 10/2013 | Sathish et al. | |
| 2014/0126881 A1 | 5/2014 | Yoneda et al. | |
| 2014/0198215 A1 | 7/2014 | Schumm et al. | |
| 2014/0270684 A1 | 9/2014 | Jayaram et al. | |
| 2017/0094326 A1 | 3/2017 | Arimilli et al. | |
| 2017/0111674 A1 | 4/2017 | Meredith et al. | |

OTHER PUBLICATIONS

Inamoto, Naho et al., "Virtual viewpoint replay for a soccer match by view interpolation from multiple cameras", Multimedia, IEEE Transactions on 9.6 (2007): 1155-1166.

Kobla, Vikrant et al., "Identifying sports videos using replay, text, and camera motion features", Electronic Imaging. International Society for Optics and Photonics, 1999.

Li, Baoxin et al., "Event detection and summarization in sports video", Content-Based Access of Image and Video Libraries, 2001. (CBAIVL 2001).

Niamut, O. A. et al., "Immersive Live Event Experiences-Interactive UHDTV on Mobile Devices", 2014.

Quang Minh Khiem, Ngo et al., "Supporting zoomable video streams with dynamic region-of-interest cropping", Proceedings of the first annual ACM SIGMM conference on Multimedia systems. ACM, 2010.

* cited by examiner

DYNAMIC VIDEO IMAGE SYNTHESIS USING MULTIPLE CAMERAS AND REMOTE CONTROL

CROSS-REFERENCE TO RELATED APPLICATION

This application is a continuation of U.S. application Ser. No. 14/884,495, filed Oct. 15, 2015. All sections of the aforementioned application(s) and patent(s) are incorporated herein by reference in their entirety.

FIELD OF THE DISCLOSURE

The subject disclosure relates to a system that synthesizes multiple camera images into a single image at remote location according to local user control.

BACKGROUND

Typically, viewers of broadcast television content are only presented with a single point of view from a single camera at one time. In addition, when multiple camera images are available for a broadcast event, the broadcast media provider determines when, if ever, to combine the multiple images into a single image to be broadcast to all viewers.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for providing custom viewing experiences to individual viewers. Typically, a broadcast media provider decides which camera feed to provide. Exemplary embodiments would allow individual viewers to request or create their own custom viewpoints. Other embodiments are described in the subject disclosure.

One or more aspects of the subject disclosure includes a method that includes receiving, at a broadcast image processor, from a broadcast event, a plurality of camera feeds, wherein the camera feeds each comprise an image of the broadcast event from a different angle, storing, by the broadcast image processor, data generated by the plurality of camera feeds in a buffer for a predetermined period of time, generating, by the broadcast image processor, a summary of selectable options associated with the plurality of camera feeds to a media processor, receiving, by the broadcast image processor, a request from the media processor for presenting a custom viewing of the broadcast event, wherein the request comprises timing data and camera angle data for generating the custom viewing of the broadcast event, selecting, by the broadcast image processor, a first camera feed of the plurality of camera feeds and a second camera feed of the plurality of camera feeds according to the camera angle data included in the request, selecting, by the broadcast image processor, from the buffer of data, first data generated by the first camera feed of the plurality of camera feeds according to the timing data included in the request and second data generated by the second camera feed of the plurality of camera feeds according to the timing data included in the request, synthesizing, by the broadcast image processor, the custom viewing of the broadcast event according to the first data and the second data, and providing, by the broadcast image processor, the custom viewing of the broadcast event to the media processor.

One or more aspects of the subject disclosure include machine-readable storage medium, comprising executable instructions that, when executed by a processor, facilitate performance of operations including receiving a broadcast event from a broadcast image processor, wherein the broadcast event includes a plurality of camera feeds, wherein the camera feeds each comprise an image of the single broadcast event from a different angle, receiving a summary of the plurality of camera feeds from the broadcast image processor, presenting the summary of the plurality of camera feeds in a selection element, wherein the selection element includes a time selection element and a camera angle creation element, wherein the selection element receives an input to create a request including a custom time and a custom camera angle, sending the request to the broadcast image processor, and receiving, from the broadcast image processor, a synthesized custom view including a first camera feed of the plurality of camera feeds and a second camera feed of the plurality of camera feeds according to the custom camera angle.

One or more aspects of the subject disclosure includes an apparatus that includes a processor and a memory that stores executable instructions that, when executed by the processor, facilitate performance of operations including receiving a broadcast event from a broadcast image processor, wherein the broadcast event includes a plurality of camera feeds, wherein the camera feeds each comprise an image of the broadcast event from a different angle, receiving a summary of selectable options associated with the plurality of camera feeds from the broadcast image processor, presenting the summary of the plurality of camera feeds in a selection presentation, wherein the selection presentation includes time selection data and camera angle creation data, wherein the selection presentation receives an input to create a request including a custom time and a custom camera angle, sending the request to the broadcast image processor, and receiving, from the broadcast image processor, a synthesized custom view including a first camera feed of the plurality of camera feeds and a second camera feed of the plurality of camera feeds according to the request.

Figure 1:
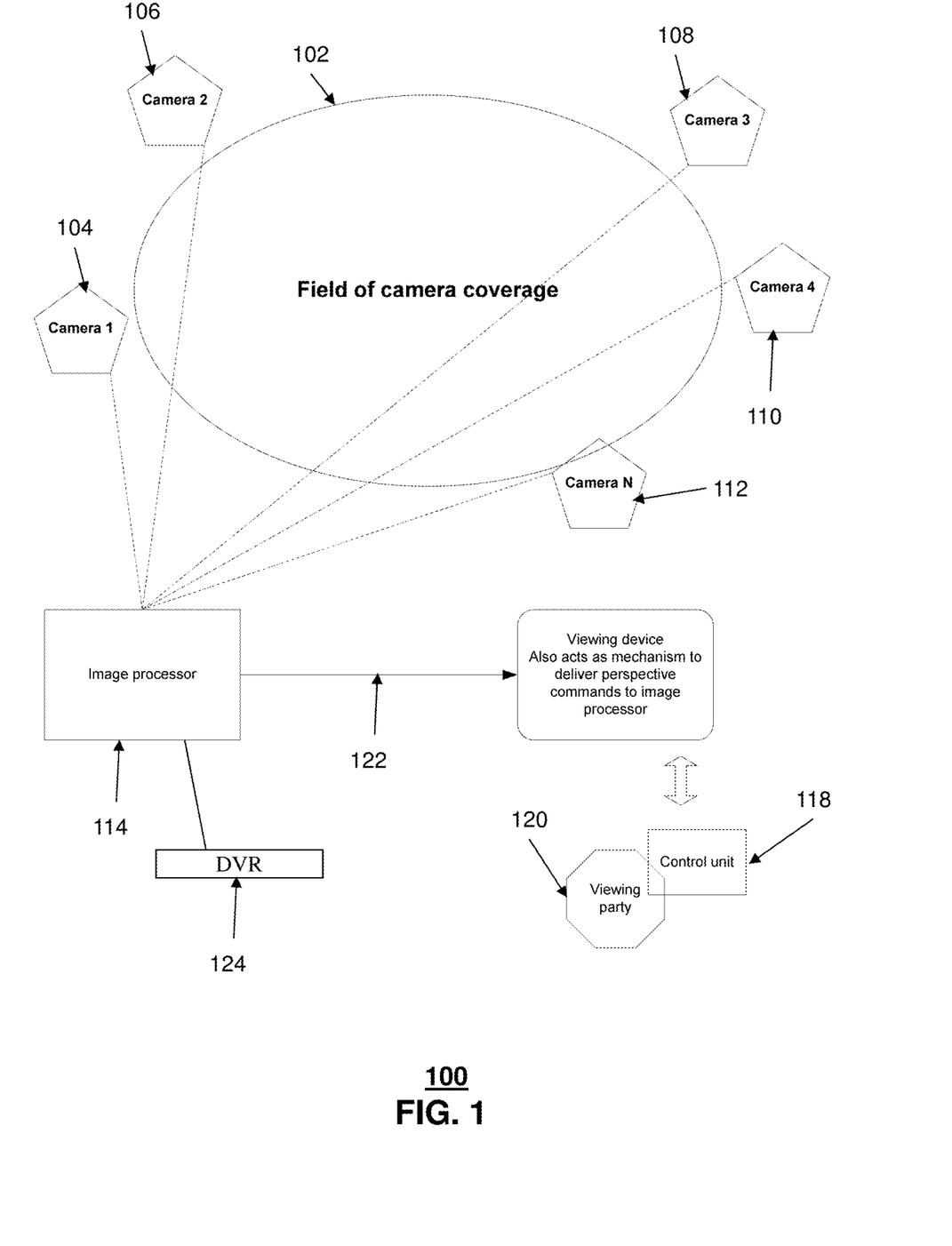
FIG. 1 depicts an illustrative embodiment of a dynamic video image synthesis system.

FIG. 1 depicts an illustrative embodiment of a dynamic video image synthesis system 100. In exemplary embodiments, a broadcast event can include many different images from different camera devices recording the same event. The different camera devices are arranged so that each one can record the event from a different angle. Typically, a controller, producer, director, or editor can choose from among all of the camera angles to find a best camera feed for a given moment of the event. The best camera feed can then be broadcast to local viewing devices. In other embodiments, several camera feeds of the many different camera devices can be chosen so as to be multicast together in a multicast so that a local device can choose between the channels each camera feed of the multicast can be viewed as determined by the user at the local device.

Exemplarily, as illustrated in FIG. 1, a dynamic video image synthesis system 100 can include an event 102 where multiple cameras or recording devices are present. The multiple cameras or recording devices can include cameras 1 though N which are illustrated as cameras 104, 106, 108, 110, 112, and 114. The cameras can include other devices such as microphones or virtual cameras, such as a virtual camera creating images internally from a video game. Each, or a portion, of the multiple cameras or recording devices 104, 106, 108, 110, 112, and 114 can provide their audio and video data the broadcast image processor 116.

The broadcast image processor 116 can be connected to local viewing devices either through broadcast channels or through an Internet connection. In one embodiment, a local control unit 118 can receive the broadcast output from the broadcast image processor 116 to provide the broadcast feed to the viewer 120 of the local control unit. Exemplarily, the local control unit 118 can include a media processor, a set-top box, or other computing device to provide a video and audio output to a display device.

Additionally, the broadcast image processor 116 can combine different video feeds of the multiple cameras or recording devices 104, 106, 108, 110, 112, and 114 so as to create a custom view point by synchronizing the different video feeds of the multiple cameras or recording devices 104, 106, 108, 110, 112, and 114 into a single video image. Additionally, the broadcast image processor 116 can combine audio inputs from one or more of the multiple cameras or recording devices 104, 106, 108, 110, 112, and 114 into a stereo audio output. Additionally, the broadcast image processor 116 can utilize a digital video recorder 124 for recording one or more of the multiple cameras or recording devices 104, 106, 108, 110, 112, and 114 to access past camera feeds of the event to allow the creation of custom view points from previous points in time of the broadcast.

Exemplarily, the broadcast image processor 116 can synthesize or otherwise create custom viewpoint image data from two or more image feeds. Exemplarily, the broadcast image processor 116 can take two images and interpolate the image data to create another, new viewpoint from a new vantage point. The creation of the new images can take place through interpolation, morphing, and other techniques. In addition, the broadcast image processor 116 can create a stereo sound feed from two or more audio inputs.

Exemplarily, a communication route 122 is established between the broadcast image processor 116 and local control unit 118. Through the communication route 122, the broadcast image processor 116 can provide the broadcast to the local control unit 118. In other embodiments, the communication route 122 can include a typical broadcast path such as through cable, satellite, or fiber optic broadcast networks as well as an Internet network connection through which the broadcast image processor 116 and local control unit 118 can communicate. In addition, the communication route 122 can include a custom unicast route between the broadcast image processor 116 and local control unit 118. The unicast route between the broadcast image processor 116 and local control unit 118 can provide the path for the local control unit 118 to receive summaries of the feeds from one or more of the multiple cameras or recording devices 104, 106, 108, 110, 112, and 114, to provide requests to the broadcast image processor 116, and to receive custom media content from the broadcast image processor 116. The unicast route can include an Internet connection.

Exemplarily, the broadcast image processor 116 can accept and summarize the feeds from one or more of the multiple cameras or recording devices 104, 106, 108, 110, 112, and 114. The broadcast image processor 116 can summarize each feed and then create a summary or other description of the feeds. The broadcast image processor 116 can then provide the descriptions or summaries to the local control unit 118 through the communication route 122. Thus, the broadcast image processor 116 can provide a summary, description, or image of one or more of the multiple cameras or recording devices 104, 106, 108, 110, 112, and 114 at the event to a user at the local control unit 118.

Exemplarily, at the local control unit 118, a user can be presented with a graphical user interface through which the various feeds are illustrated on a display device associated with the local control unit 118 or through another computing device or communication device of the user so that the user can view the choices available to view. In additional embodiments, the local control unit 118 can also provide through a graphical user interface, options to choose from among the summaries of the multiple cameras or recording devices 104, 106, 108, 110, 112, and 114 to create a new, custom viewpoint. That is, in some embodiments, a user can utilize the graphical user interface through a tablet to select a camera angle while a set-top box receives and displays the selected camera angle on a display device, where both the set-top box and tablet are in communication with the broadcast image processor 114.

In addition, the local control unit 118 can also provide through a graphical user interface, options to choose from among the summaries of the multiple cameras or recording devices 104, 106, 108, 110, 112, and 114 to create a new, stereo audio output option from the event. In further embodiments, the local control unit 118 can also provide through a graphical user interface, options to choose from older, pre-recorded feeds from among the summaries of the multiple cameras or recording devices 104, 106, 108, 110, 112, and 114 from the digital video recorder 124 to create a new, custom viewpoint of an earlier point in time of the event. Depending on the capabilities of the broadcast image processor 116 and the digital video recorder 134, images can be accessed minutes earlier in the event or from the beginning of the event.

Exemplarily, the broadcast image processor 116 can be configured to receive commands from one or more local control units 118 to perform the creation of these various custom viewpoints and stereo sounds in real time as individual local control units send requests to the broadcast image processor 116. That is, in addition to providing a broadcast of the event, the broadcast image processor 116 can receive requests from local control units and provide custom images to the local control units. In some embodiments, the local control units may only be allowed to request and receive the custom viewpoints based on a subscription status of the local control device. In other embodiments, the local control units may only be allowed to request and receive the custom viewpoints based on a queue status of the request of the local control device. For example, the requests may have to wait until the local control unit 118 has sufficient capacity to create and provide the requested custom view, images, or feeds.

Once the broadcast image processor 116 has produced the requested custom view, images, or feeds, the broadcast image processor 116 can provide the requested custom view, images, or feeds to the local control unit 118. The transmission can be provided through the communication route 122 to the local control unit 118 or through other data transmission paths available to the broadcast image processor 116 and the local control unit 118. Once at the local control unit 118, the requested custom view, images, or feeds can be viewed via a display device or stored in a digital video recorder or other memory device for future viewing.

Figure 2:
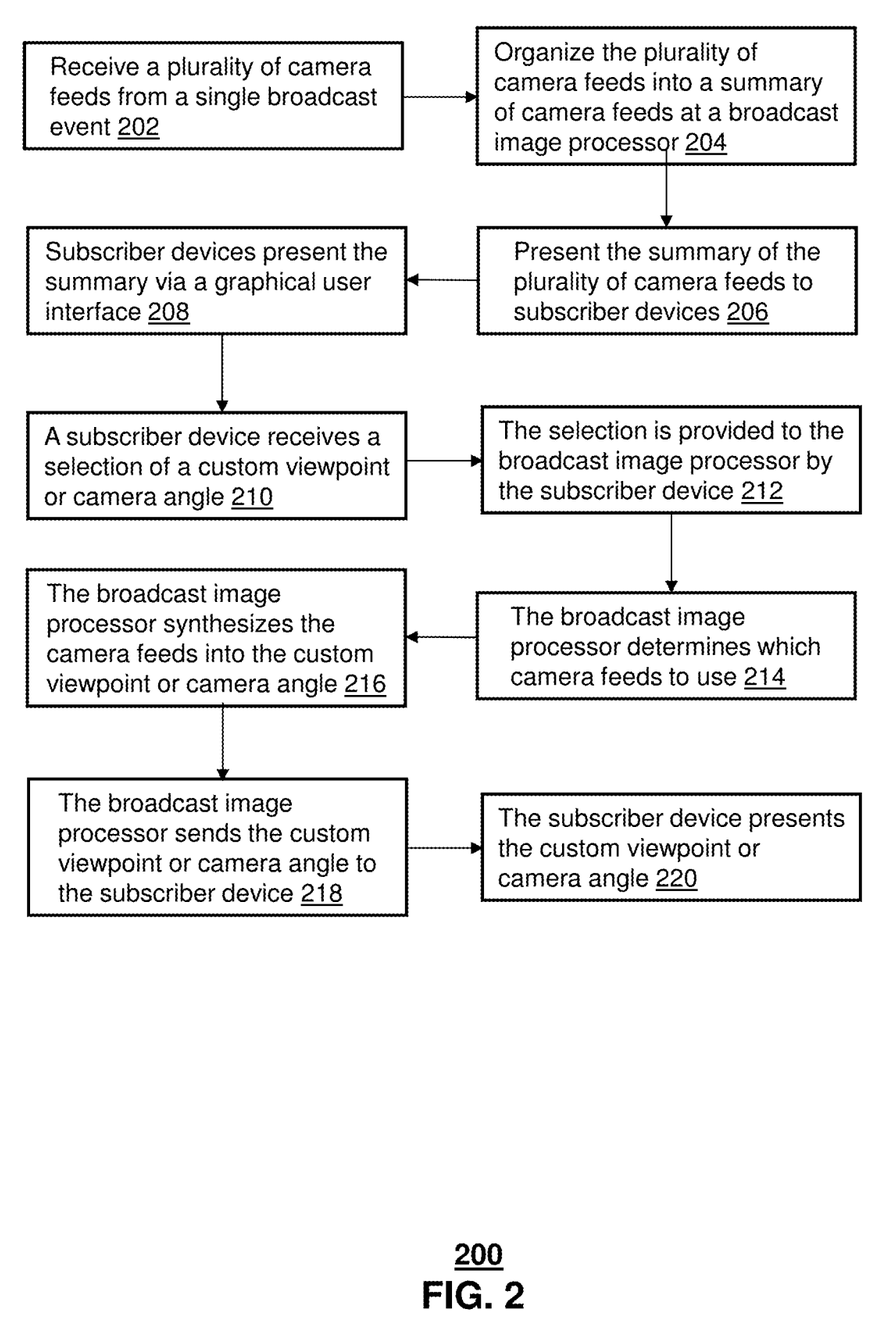
FIG. 2 depicts an illustrative embodiment of a first method used in portions of the system described in FIG. 1.

FIG. 2 depicts an illustrative embodiment of a method 200 used in portions of the system described in FIG. 1. Method 200 can begin at Step 202 where, at a broadcast event with multiple cameras recording the event, the audio and video feeds from the plurality of cameras are collected. For example, the plurality of camera feeds can be collected at a broadcast image processor or other location that may be used by the broadcaster to choose which camera angle to broadcast as the main broadcast. In other embodiments, scenes from microphones or virtual cameras can be collected depending on the type of event being broadcast. Thus, an orchestra can be recorded with several microphones to create a unique stereo sound or internal virtual cameras of a video game competition can be accessed. In additional embodiments, other non-consumer events with multiple cameras can be provided, such as road cameras or surveillance cameras.

Next, in Step 204, the broadcast image processor can organize the plurality of camera feeds. In some embodiments, the live feed from each camera feed is simply provided to a subscriber to choose from. In other embodiments, representations or descriptions of the various camera feeds are collected and summarized so as to be easily understood and recognized by recipients of the summary at a designated device. Once the various camera audio and video feeds are collected and possibly summarized at the broadcast image processor, the summaries are provided to subscriber devices in Step 206. In other embodiments, the summary can be performed at the local devices.

The subscriber devices can then present the summaries via a display so that a user may choose from among the offered camera angles in Step 208. In other embodiments, the user may choose to combine camera feeds to create a custom viewpoint. In addition, the user maybe presented with a choice to create custom camera angles. The summaries may be presented through a graphical user interface which can aid the user in selecting from all of the options available. In Step 210, the user can select, through the graphic user interface, a camera angle or custom angle. In Step 212 the user's selection is provided to the broadcast image processor. In some embodiments, the broadcast image processor can provide information regarding the summaries to the local device. In other embodiments, the local device can create summaries of the camera feeds on its own based upon camera feed information received from the broadcast image processor.

Upon receiving the user's selection, in Step 214, the broadcast image processor can determine which camera angle to use to satisfy the user's selection. In some instances, a custom angle may be requested and, in Step 216, the broadcast image processor can synthesize the viewpoints from two or more camera feeds to create a custom view in accordance with the request. In some embodiments, the synthesis can be performed in real time so as to maintain a live-broadcast of the event in question. Once the camera angles have been determined and, if necessary, a custom camera angle is synthesized, the broadcast image processor send the custom camera angle feed to the subscriber device in Step 218. In Step 220, the subscriber device can present the custom camera angle feed or otherwise save the custom camera to a digital video recorder or other storage device for later consumption.

Figure 3:
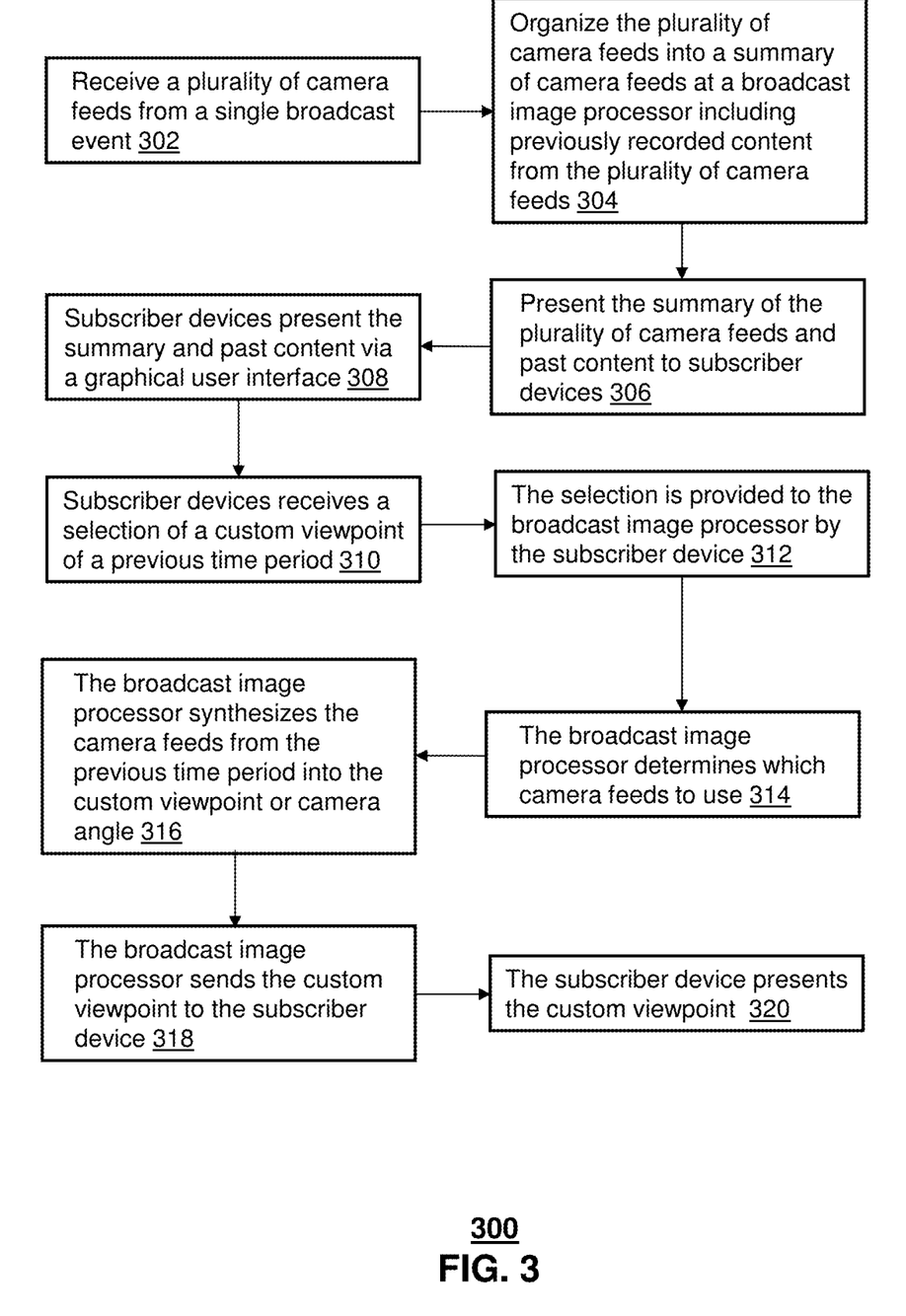
FIG. 3 depicts an illustrative embodiment of another method used in portions of the system described in FIG. 1.

FIG. 3 depicts an illustrative embodiment of a method 300 used in portions of the system described in FIG. 1. Method 300 can begin at Step 302 where, at a broadcast event with multiple cameras recording the event, the audio and video feeds from the plurality of cameras are collected. In addition, a reserve of the various camera feeds are stored and buffered for a predetermined period of time. For example, the plurality of camera feeds can be collected at a broadcast image processor or other location that may be used by the broadcaster to choose which camera angle to broadcast as the main broadcast. In some embodiments, a 30 minute buffer can be maintained by the broadcast image processor.

Next, in Step 304, the broadcast image processor can organize the plurality of camera feeds. In addition, buffer information including the content in the buffering for one or more of the camera feeds is additionally organized. For example, a user may choose to rewatch the event at a past period of time from a different angle on the fly. In some embodiments, the live feed from each camera feed is simply provided to a subscriber to choose from. Depending on the capabilities of the broadcast image processor, a select number of buffers can be provided for all or less than all of the camera feeds.

Next, in Step 306, representations or descriptions of the various camera feeds and the state of the various available buffers are collected and summarized so as to be easily understood and recognized by recipients of the summary Once the various camera audio and video feeds are collected and possibly summarized, the summaries are provided to subscriber devices in Step 306. In some embodiments, the broadcast image processor can provide information regarding the summaries to the local device. In other embodiments, the local device can create summaries of the camera feeds on its own based upon camera feed information and buffer information received from the broadcast image processor.

The subscriber devices can then present the summaries via a display so that a user may choose from among the offered camera angles in Step 308. The user can also be presented with an identification of which camera feeds are buffered and available for an on-the-fly rewind and possible creation of customized viewpoints of the older content stored in the buffer for the one or more camera feeds. In addition, the user may be presented with a choice to create custom camera angles. The summaries may be presented through a graphical user interface which can aid the user in selecting from all of the options available. In Step 310, the user can select, through the graphic user interface, a camera angle or custom angle as well as any camera angle or custom angles from the available buffered content. In Step 312 the user's selection is provided to the broadcast image processor.

Exemplarily, the user can be presented with a summary of available content from the broadcast image processor. The summary can include the relevant camera feeds and camera angles. Thus, for example, in some embodiments, there may be too many camera feeds to reasonably display at once and only the most relevant camera feeds or shown. Or the user is presented with a menu to select from the different camera feeds. In addition, the summary can contain a time selection element, such as a slider that can be used to access prior time points in the broadcast from any one of the camera feeds. In other embodiments, each individual camera feed can have its own time slider feature. Or, in other embodiments, groups of camera feeds can be grouped together with a mutual time slider feature for that group.

Exemplarily, the user can then select different camera feeds as well as the time points from the summary. In other embodiments, the user can presented with an option to instead select a custom angle of the event. That is, the user could be presented with a map or other representation of the event and chose from which vantage point he would want the custom camera angle to be from.

Upon receiving the user's selection, in Step 314, the broadcast image processor can determine which camera angle to use to satisfy the user's selection. In other embodiments, the broadcast image processor can use the selected camera feeds to create the custom view by synthesizing the images together. The broadcast image processor can also access the buffered camera feeds in order to satisfy the user's selection. In some instances, a custom angle may be requested and, in Step 316, the broadcast image processor can synthesize the viewpoints from two or more camera feeds as well as from buffered camera feeds to create a custom view in accordance with the request. In some embodiments, the synthesis can be performed in real time so as to maintain a live-broadcast of the event in question while in other embodiments, the live event broadcast is paused or recorded in a digital video device while a custom presentation of buffered camera feeds are presented.

Once the camera angles have been determined and, if necessary, a custom camera angle is synthesized, the broadcast image processor send the custom camera angle feed to the subscriber device in Step 318. In Step 320, the subscriber device can present the custom camera angle feed or otherwise save the custom camera to a digital video recorder or other storage device for later consumption. Exemplarily, the user can further manipulate the presentation. For example, the user may continue to adjust the time presentation of the viewpoints, such as by going back and forth, in regular speed, slow-motion, or fast-forward or fast-rewind. In addition, the user can continue to request additional custom viewpoints. Additionally, the user may zoom in or out of the image. Thus, for example, the user can exemplarily, create a first request at a first time data point with a first selected custom camera angles. Upon reaching a point in the presentation of the custom camera angle, the user may decide to select a new angle at that period of time or another period of time. These new requests can be processed and returned to the set-top box as desired.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In additional embodiments, any number of events that utilize different numbers of camera, microphones, and other recording devices can be presented through a processor that can create custom views, sounds, and other presentations. These presentations can then be summarized and presented at local media processors. The media processors can request custom viewpoints from the processor for display.

Figure 4:
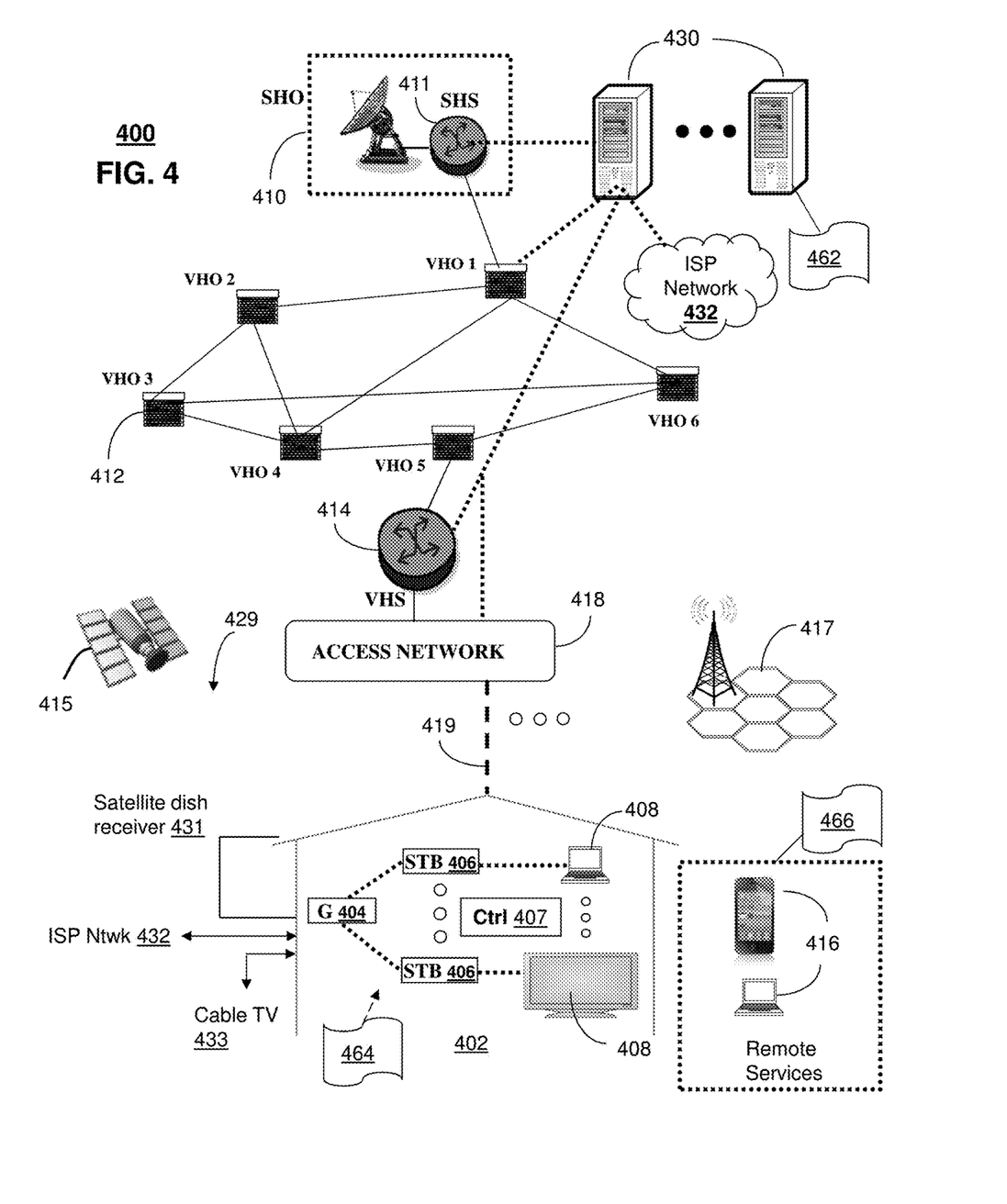
FIG. 4 depicts illustrative embodiments of communication systems that provide media services in portions of the system described in FIG. 1 and methods described in FIGS. 2-3.

FIG. 4 depicts an illustrative embodiment of a first communication system 400 for delivering media content. The communication system 400 can represent an Internet Protocol Television (IPTV) media system. Communication system 400 can be overlaid or operably coupled with dynamic video image synthesis system 100 as another representative embodiment of communication system 400. For instance, one or more devices illustrated in the communication system 400 of FIG. 4 can receive, at the broadcast image processor, from a single broadcast event, a plurality of camera feeds, wherein the camera feeds each comprise an image of the single broadcast event from a different angle, providing, by the broadcast image processor, a summary of the plurality of camera feeds to a media processor, receive, by the broadcast image processor, a request to select a requested angle from among the plurality of camera feeds from the media processor and create, by the broadcast image processor, a custom view from the plurality of camera feeds according to the request for the media processor The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. Thus, as illustrated in FIG. 1, the broadcast image processor 116 and local control unit 118 can be connected and communicate via the communication route 122 which can include the ISP network 432 and a broadcast IPTV system, cable TV system 433, and/or satellite broadcast television system 429.

Communication system 400 can also provide for all or a portion of the computing devices 430 to function as a broadcast image processor (herein referred to as broadcast image processor 430). The broadcast image processor 430 can use computing and communication technology to perform function 462, which can include among other things, synthesizing the viewpoints from two or more camera feeds to create a custom view in accordance with a request from a set-top box associated with the broadcast image processor as described, for example, in Step 216 of FIG. 2. For instance, function 462 of server 430 can be similar to the functions described for the broadcast image processor of method 200. The media processors 406 and wireless communication devices 416 can be provisioned with software functions 464 and 466, respectively, to utilize the services of broadcast image processor 430. For instance, functions 464 and 466 of media processors 406 and wireless communication devices 416 can be similar to the functions described for the local control unit 118 of FIG. 1 in accordance with method 200.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
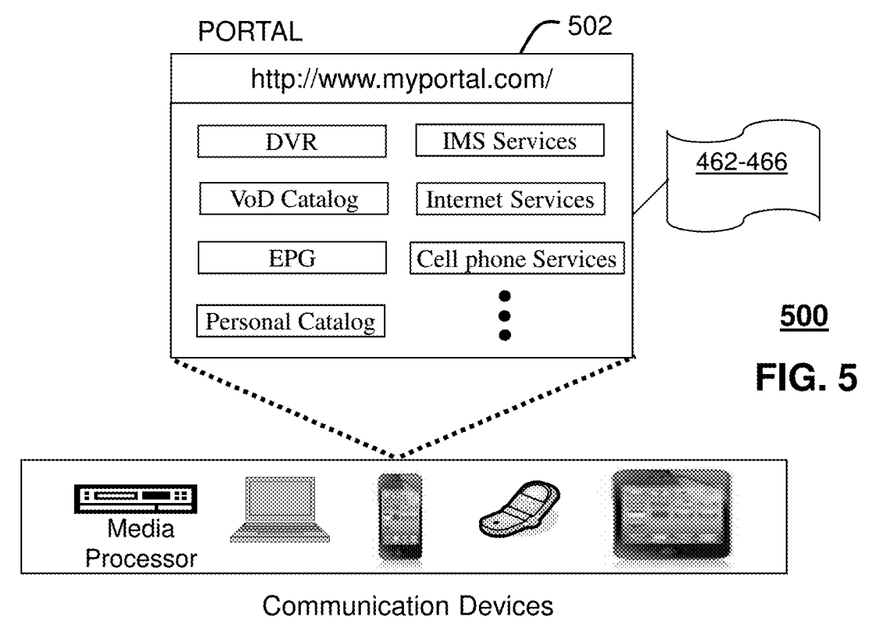
FIG. 5 depicts an illustrative embodiment of a web portal for interacting with the communication systems of FIG. 1.

FIG. 5 depicts an illustrative embodiment of a web portal 502 of a communication system 500. Communication system 500 can be overlaid or operably coupled with the dynamic video image synthesis system 100 of FIG. 1, communication system 400 as another representative embodiment of dynamic video image synthesis system 100 and communication system 400. The web portal 502 can be used for managing services of the dynamic video image synthesis system 100, the broadcast image processor 114, the local control unit 118, the communication route 122, and communication system 400. A web page of the web portal 502 can be accessed by a Uniform Resource Locator (URL) with an Internet browser using an Internet-capable communication device such as those described in FIG. 1 as a local control unit 118 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 464 and 466 to adapt these applications as may be desired by subscribers and/or service providers of dynamic video image synthesis system 100 of FIG. 1 and communication systems 400. For instance, subscribers of the broadcast image processor 116 and server 430 can log into their on-line accounts and provision server 430 with their account information so as to utilize the abilities of the dynamic video image synthesis system 100. Service providers can log onto an administrator account to provision, monitor and/or maintain the dynamic video image synthesis system 100 of FIG. 1 or server 430.

Figure 6:
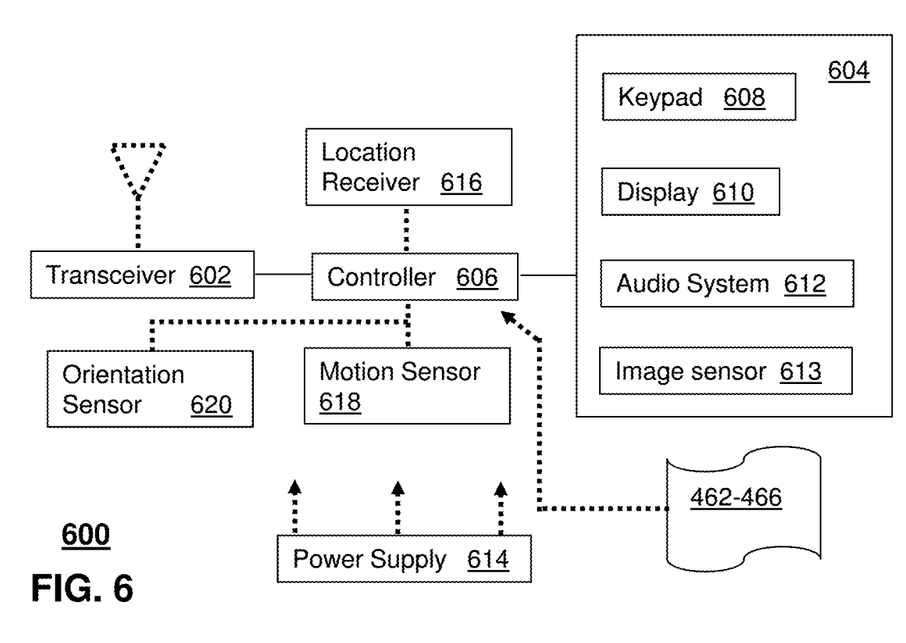
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and FIG. 4 and can be configured to perform portions of a local control unit 118, for example, where a user can access summaries of the camera feeds through a communication device.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the local control unit 118, the media processor 406, the media devices 408, or the portable communication devices 416 of FIG. 4. It will be appreciated that the communication device 600 can also represent other devices that can operate in dynamic video image synthesis system 100 of FIG. 1, communication system 400 of FIG. 4 such as a gaming console and a media player. In addition, the controller 606 can be adapted in various embodiments to perform the functions 462, 464, and 466, respectively.

Upon reviewing the aforementioned embodiments, it would be evident to an artisan with ordinary skill in the art that said embodiments can be modified, reduced, or enhanced without departing from the scope of the claims described below. For example, other events can be used such as synthesizing the viewpoints from an online video game competition or creating a custom stereo audio feed from a concert, debate, sports broadcast, or other events. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
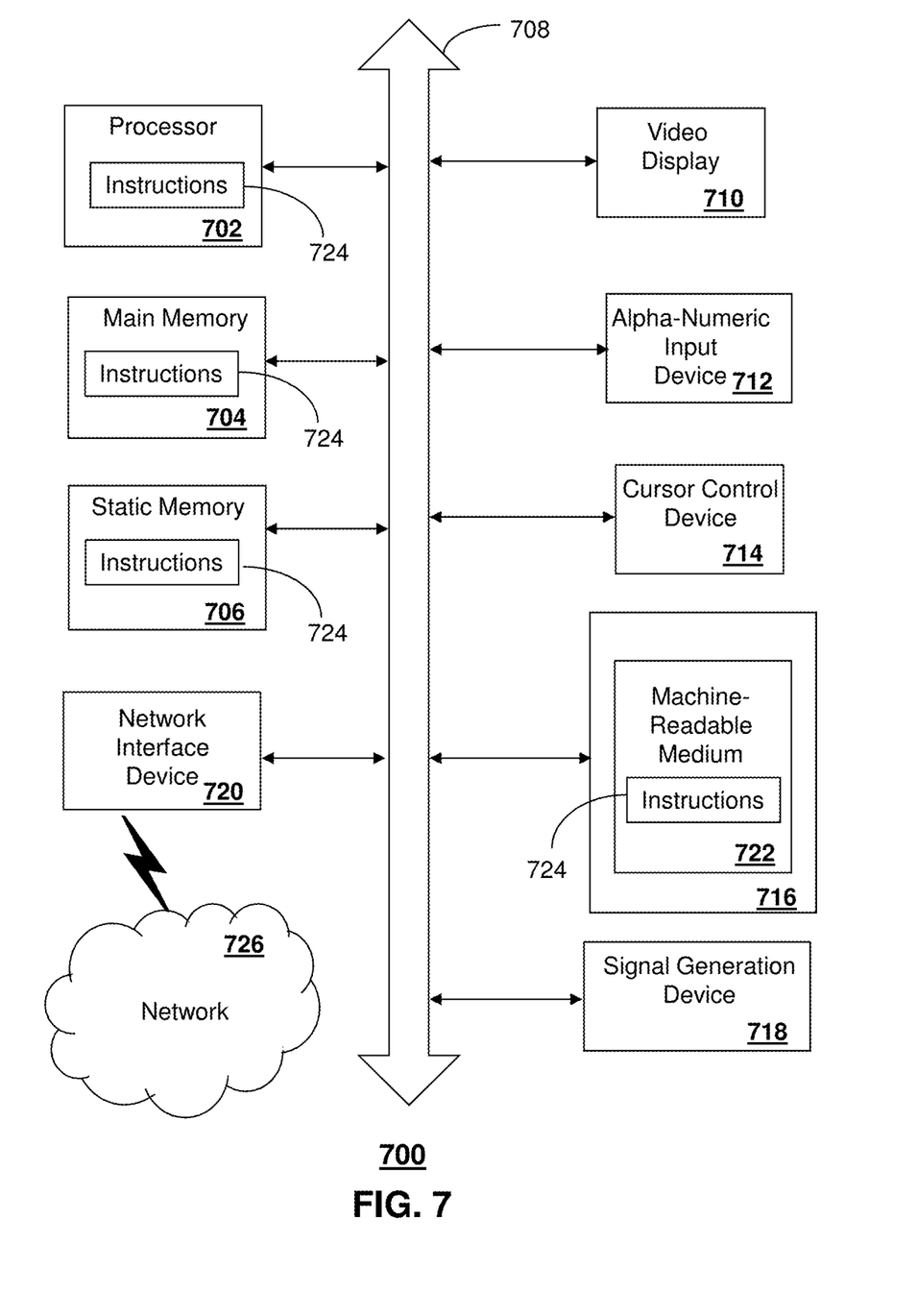
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the broadcast image processor 430, the media processor 406, a set-top box or media processor acting as a local control unit 118 and the broadcast image processor 114 and other devices of FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   sending to a mobile device, by a broadcast image processor comprising a processing system including a processor, camera feed information from a broadcast event, the camera feed information including a plurality of camera feeds, wherein each camera feed of the plurality of camera feeds comprises an image of the broadcast event from a different angle;
   receiving, by the broadcast image processor, a request from the mobile device for presenting a custom viewing angle of the broadcast event, wherein the request is generated via a graphical user interface of the mobile device;
   synthesizing, by the broadcast image processor, the custom viewing angle of the broadcast event according to a first camera feed and a second camera feed of the plurality of camera feeds according to camera angle data included in the request;
   providing, by the broadcast image processor, the custom viewing angle of the broadcast event to a media processor, wherein the synthesizing and providing are performed in real time responsive to the request from the mobile device via the graphical user interface, and wherein the media processor and the mobile device are in communication with the broadcast image processor;
   instructing, by the broadcast image processor, the mobile device to provide a visual presentation in the graphical user interface of a time slider feature of available content of the plurality of camera feeds in a buffer, wherein the buffer contains buffered content from the plurality of camera feeds, wherein the visual presentation further includes a plurality of time selection elements to access the available content from the plurality of camera feeds from the time slider feature, wherein each time selection element of the plurality of time selection elements is associated with a respective one of the available content of the plurality of camera feeds in the buffer; and
   receiving, by the broadcast image processor, a trick play request to modify the custom viewing angle via the plurality of time selection elements, wherein the broadcast image processor provides, in response to the trick play request, a buffered presentation of the custom viewing angle from the buffer.

2. The method of claim 1, wherein the trick play request includes a point in time, wherein the point in time is determined based upon detecting an input at one of:
   a first time selection element of the plurality of time selection elements that corresponds to all of the camera feeds of a first one of the plurality of camera feeds, or
   a second time selection element of the plurality of time selection elements that corresponds to all of the camera feeds of a second one of the plurality of camera feeds.

3. The method of claim 2, wherein the first time selection element comprises a first time slider and wherein the second time selection element comprises a second time slider.

4. The method of claim 1, wherein the graphical user interface includes summaries of the plurality of the camera feeds that are generated by the mobile device based upon the camera feed information received from the broadcast image processor.

5. The method of claim 1, wherein the first camera feed comprises first images at a first viewing angle, wherein the second camera feed comprises second images at a second viewing angle.

6. The method of claim 5, wherein the synthesizing comprises interpolating between the first images and the second images to generate the custom viewing angle of the broadcast event.

7. The method of claim 1, further comprising receiving a second request to select a second custom viewing of the broadcast event.

8. The method of claim 7, further comprising creating the second custom viewing from the plurality of camera feeds by synthesizing the first camera feed of the plurality of camera feeds and the second camera feed of the plurality of camera feeds.

9. The method of claim 8, further comprising providing the second custom viewing to the media processor via a unicast communication path.

10. The method of claim 1, wherein the broadcast event comprises a video gaming event, and wherein the plurality of camera feeds comprise a plurality of virtual camera feeds from the video gaming event.

11. A non-transitory, machine-readable storage medium comprising executable instructions that, when executed by a processing system of a broadcast image processor, facilitate performance of operations, the operations comprising:
    sending, to a mobile device, video feed information from a broadcast event, the video feed information including a plurality of video feeds, wherein each video feed of the plurality of video feeds comprises an image of the broadcast event from a different angle;
    synthesizing a custom viewing angle of the broadcast event according to a first video feed and a second video feed of the plurality of video feeds according to video angle data responsive to receiving a request from the mobile device for presenting the custom viewing angle of the broadcast event, wherein the request is generated via a graphical user interface of the mobile device;
    providing the custom viewing angle of the broadcast event to a media processor, wherein the synthesizing and providing are performed in real time responsive to the request from the mobile device via the graphical user interface, and wherein the media processor and the mobile device are in communication with the broadcast image processor; and
    instructing the mobile device to provide a visual presentation in the graphical user interface of a time slider feature of available content of the plurality of video feeds in a buffer, wherein the buffer contains buffered content from the plurality of video feeds, wherein the visual presentation further includes a plurality of time selection elements to access the available content from the plurality of video feeds from the time slider feature, wherein each time selection element of the plurality of time selection elements is associated with a respective one of the available content of the plurality of video feeds in the buffer.

12. The non-transitory, machine-readable storage medium of claim 11, wherein the providing of the custom viewing angle is via a broadcast channel from the broadcast image processor.

13. The non-transitory, machine-readable storage medium of claim 11, wherein the operations further comprise receiving a trick play request, wherein the trick play request includes a point in time, wherein the point in time is determined based upon detecting an input at one of:
    a first time selection element of the plurality of time selection elements that corresponds to all of the video feeds of a first one of the plurality of video feeds, or
    a second time selection element of the plurality of time selection elements that corresponds to all of the video feeds of a second one of the plurality of video feeds.

14. The non-transitory, machine-readable storage medium of claim 13, wherein the first time selection element comprises a first time slider and wherein the second time selection element comprises a second time slider.

15. The non-transitory, machine-readable storage medium of claim 11, wherein the graphical user interface includes summaries of the plurality of the video feeds that are generated by the mobile device based upon the video feed information received from the broadcast image processor.

16. The non-transitory, machine-readable storage medium of claim 11, wherein the operations further comprise:
    receiving a trick play request to modify the custom viewing angle via the plurality of time selection elements; and
    providing, in response to the trick play request, a buffered presentation of the custom viewing angle from the buffer.

17. An apparatus, comprising:
    a processing system including a processor; and
    a memory that stores executable instructions that, when executed by the processing system, facilitate performance of operations, the operations comprising:
        providing a plurality of camera feeds for a broadcast event to a media processor, wherein each of the plurality of feeds comprises an image from the broadcast event, wherein each of the plurality of camera feeds is in one of a plurality of camera feed groups, and wherein each of the plurality of camera feed groups comprises at least two of the plurality of camera feeds;
        providing, to a mobile device, a summary of selectable options associated with the plurality of camera feeds to be displayed at a graphical user interface on the mobile device, wherein the providing the summary comprises providing a visual presentation of a time slider feature of available content of a plurality of the plurality of camera feeds in a buffer, wherein the providing the visual presentation comprises providing a plurality of time selection elements for accessing the available content from the time slider feature, wherein each respective time selection element of the plurality of time selection elements is associated with a respective one of the available content of the plurality of camera feeds;
        receiving a request from the mobile device, responsive to input via the graphical user interface, for presenting a custom viewing of the broadcast event based on the summary of selectable options, wherein the request comprises timing data and camera angle data for generating the custom viewing of the broadcast event;
        creating the custom viewing from the plurality of camera feeds according to the request by synthesizing the custom viewing from a first camera feed of the plurality of camera feeds and a second camera feed of the plurality of camera feeds, wherein the first camera feed and the second camera feed are determined based on the request; and providing, to the media processor, the custom viewing, wherein the synthesizing and providing are performed in real time responsive to the request from the mobile device, and wherein both the media processor and the mobile device are in communication with the processing system.

18. The apparatus of claim 17, wherein the timing data is determined based upon detecting an input from the selectable options comprising:
   a first time selection element of a plurality of time selection elements that corresponds to all of the camera feeds of a first one of the plurality of camera feed groups, and
   a second time selection element of the plurality of time selection elements that corresponds to all of the camera feeds of a second one of the plurality of camera feed groups.

19. The apparatus of claim 18, wherein the graphical user interface includes summaries of the camera feeds that are generated by the mobile device based upon the selectable options.

20. The apparatus of claim 17, wherein the operations further comprise creating a second custom viewing from the plurality of camera feeds by synthesizing the first camera feed of the plurality of camera feeds and the second camera feed of the plurality of camera feeds responsive to receiving a second request to generate the second custom viewing of the broadcast event.

* * * * *